(12) United States Patent
Xia et al.

(10) Patent No.: US 7,304,170 B2
(45) Date of Patent: Dec. 4, 2007

(54) METHOD OF PRODUCING POLYESTERIFIED LIQUID ANTHRAQUINONE-BASED COLORANTS

(75) Inventors: Jusong Xia, Moore, SC (US); Chunping Xie, Spartanburg, SC (US); Vanessa Creel, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 203 days.

(21) Appl. No.: 10/460,875

(22) Filed: Jun. 14, 2003

(65) Prior Publication Data

US 2004/0250357 A1    Dec. 16, 2004

(51) Int. Cl.
*C07C 50/18* (2006.01)
(52) U.S. Cl. ..................................... 552/255
(58) Field of Classification Search ............ 552/255
See application file for complete search history.

(56) References Cited

U.S. PATENT DOCUMENTS

| | | | |
|---|---|---|---|
| 4,137,243 A | 1/1979 | Farmer | 260/378 |
| 4,284,279 A | 8/1981 | Mori | 369/63 |
| 4,846,846 A | 7/1989 | Rekers et al. | 8/815 |
| 4,999,418 A | 3/1991 | Krutak et al. | 528/272 |
| 5,032,670 A | 7/1991 | Parham et al. | 528/220 |
| 6,528,564 B1 | 3/2003 | Xia | 524/242 |

*Primary Examiner*—Barbara P. Badio
(74) *Attorney, Agent, or Firm*—Terry T. Moyer; Robert M. Lanning

(57) ABSTRACT

An inventive blue colorant comprising a chromophore having at least one hydroxy group-terminated polyester chain attached, through a suitable alkylamino linking group (or groups), to the 1-position, the 4-position, or both, of an anthraquinone backbone is provided. Such colorants exhibit excellent amine/base stability and thermal stability, effective colorations, excellent low extraction rates, and high light-fastness levels, particularly when incorporated within certain media and/or on the surface of certain polyurethane substrates. The polyester chain or chains can be conveniently tailored to increase the solubility or compatibility in different types of polyurethane resin precursors thereby permitting the introduction of such excellent coloring chromophores within diverse polyurethane media and/or or diverse polyurethane substrates as well as provides a liquid colorant which facilitates handling. Compositions and articles comprising such inventive colorants are provided as well as methods for producing such inventive colorants.

4 Claims, No Drawings

METHOD OF PRODUCING POLYESTERIFIED LIQUID ANTHRAQUINONE-BASED COLORANTS

FIELD OF THE INVENTION

This invention relates to an inventive blue colorant comprising a chromophore having at least one polyester chain attached, through a suitable alkylamino linking group (or groups), to the 1-position, the 4-position, or both, of an anthraquinone backbone. Such colorants exhibit excellent amine/base stability and thermal stability, effective colorations, excellent low extraction rates, and high lightfastness levels, particularly when incorporated within certain media and/or on the surface of certain polyurethane substrates. The polyester chain or chains can be conveniently tailored to increase the solubility or compatibility in different types of polyurethane resin precursors thereby permitting the introduction of such excellent coloring chromophores within diverse polyurethane media and/or or diverse polyurethane substrates as well as provides a liquid colorant which facilitates handling. Compositions and articles comprising such inventive colorants are provided as well as methods for producing such inventive colorants.

DISCUSSION OF THE PRIOR ART

All U.S. patents cited within this specification are hereby incorporated by reference.

There continues to be a need to provide versatile colorants within various polyurethane applications such that the coloring agent itself exhibits excellent colorations, high thermal stability and amine/base stability, excellent lightfastness, low extraction (or drastic reduction in possibility of removal therefrom via extraction by solvents or like sources), ease in handling, ability to mix thoroughly with other coloring agents and thus to provide effective different hues and tints within or on target substrates, and acceptable toxicity levels. Most important, however, is the need to provide a colorant that exhibits all of the above benefits as well as excellent stability in the presence of high amounts of diisocyanates within the produced polyurethane articles. There has been a need to provide such improved colorants meeting this criteria for certain thermosets such as polyurethane foam applications, such that the colorants themselves exhibit excellent compatibility therein. In particular, such characteristics for polyurethanes are desired for colorants that absorb primarily within the blue portion of the visible spectrum. It is believed and, as noted above, has been determined that such desirable polyurethane colorations with the characteristics noted above are possible through the addition of certain pendant groups [such as, for example poly(oxyalkylene) groups] to the chromophore backbone which do not act as couplers or color modifiers, for example, for blue anthraquinone chromophores, but do prevent migration of the base chromophore from the target polyurethane article. However, such polyoxyalkylenated blue colorants, for example Reactint® Blue X17AB (from Milliken Chemical), have shown too low a resistance to diisocyanate attack such that the blue color and/or non-migratory characteristics are reduced, at times drastically.

Previous coloring agents for such polyurethane end-uses have included pigments, dyes, or dyestuffs, with each having its own drawback, be it an extraction problem from the finished article, a handling problem during manufacturing due to solid dust particles, or a staining problem, due to the difficulty associated with cleaning coloring agents from manufacturing machinery after colored foam production, and other like issues. As a result, the application of such pigments, dyes, and/or dyestuffs as colorants within polyurethanes is greatly limited and far from satisfactory due to such physical limitations. However, the utilization of such colorants is highly desired for the hues and shades they provide within the ultimate thermoplastic and thermoset articles themselves. As a result, there is a clear desire to provide easier to handle, more thermally stable, less extractable, more base/amine stable, more compatible with to-be-colored polyurethane substrates or resins, easy-to-clean, and especially, stable at an elevated isocyanate index (e.g., an excess of isocyanate constituent in an amount above about 8% by total weight), etc, coloring agents for introduction within thermoset (polyurethane) articles to provide decorative, aesthetic, and other like effects. Facilitating the introduction of such chromophores within such formulations is thus a highly desired target within the colored thermoplastic and thermoset industry, whether it be in terms of handling, thermal stability, extraction, base/amine stability, compatibility, cleaning, or the like.

Polymeric colorants have become the preferred coloration method in industry for polyurethane products, such as foams, resins, and the like. Being liquid in nature, these polymeric colorants contain hydroxyl terminated polyoxyalkylene chain (or chains) and actually tend to react to and within the urethane during polymerization. As a result, the color is integrated within the foam and provides excellent uniformity and depth throughout the entire article. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition to form the desired colored foam. Such foamed products require the presence of a catalyst or catalysts to effectuate the desired reaction between the polyol and isocyanate components. The most prevalent catalysts, due to cost in using, and disposing, are tertiary amine-based compounds. To reduce emissions of residual amine catalysts, the industry has turned to using hydroxyl-terminated type amine catalysts, most notably DMEA and DABCO TL catalysts (a blend of triethylene diamine and 2-{[2-dimethylamino)ethyl]methylamino}ethanol) and Texacot ZF10 (N,N,N'-trimethyl-N'-hydroxyethyl-bis(aminoethyl)ether). These catalysts unfortunately present the ability to exaggerate certain problems within the resultant foams, most notably color loss and/or degradations. Apparently, such catalysts could react with colorants such as TPM-based chromophores during polyurethane formation. The high temperatures associated with polyurethane foam production permits attack on the positively charged TPM polymeric colorants, such as Reactint® Blue X3LV (from Milliken Chemical). With a strong positive charge on the base carbon of such a TPM chromophore, the hydroxyls present within the catalyst are drawn to the colorant and appear to react in some fashion to weaken the necessary strong color-producing positive charge. Such deleterious weakening of the TPM color strength (through the believed degradation of the actual colorant structure itself), thus apparently causes a severe reduction in color and/or a shift of hue within the foam media. Seemingly, such high temperature discolorations and degradations more readily occur between about 15 and 60 minutes after foam generation (after gelation and blowing of the foam-producing composition) has taken place. Without the presence of environmentally unfriendly and thus avoided CFC auxiliary blowing agents, such an exothermic reaction reaches higher temperatures that exaggerate the problem and thus need alternate methods of dissipation in order to permit color retention of the previously utilized blue colorant components of the standard black colorant formulation. Due to the insulating effect of polyurethane foams as well, these high temperatures are also retained for several hours, if not days, also permitting exaggeration of this problem. Thus, in effect the high temperatures generated in such a manner increase the rate of attack by the nitrogen of the catalyst on the TPM constituents. As a result, discrete areas within the middle of the final article are most likely discolored as compared with the remaining portions of the article.

One specific issue exists in the utilization of certain blue polymeric colorants as components within polyurethane articles (slabstock foams, in particular). Such blue colorants (for instance, triphenylmethanes, referred to as TPM colorants, and/or anthraquinones, referred to as AQ colorants) which comprise highly desirable polyoxyethylene chains, polyoxypropylene chains, or both, provide extremely effective colorations to target polyurethane media. However, as noted above, certain polymerization catalysts, which happen to be some of the desired catalysts throughout the industry, tend to attack, for example, the TPM chromophore at the positively charged carbon center and/or the nitrogen linking groups (present between the TPM backbone and the polymeric chains), thereby degrading the colorants themselves and/or changing the hue thus preventing effective colorations of the target foam article. The target blue colorations thus suffer greatly in terms of color retention and exhibit color loss or shade modification (e.g., loss of blue colorant, or as noted previously, loss of non-migratory properties). To solve the above-noted degradation issue, certain anthraquinone-based polymeric colorants, including those disclosed in U.S. Pat. No. 4,137,243 to Farmer, and U.S. Pat. No. 4,846,846 to Rekers et al., have been utilized as an alternative to such TPM-based types for polyurethane foam end-uses.

Anthraquinone-based colorants have been known in the art for a long period of time and are widely used due to their high color strength, broad range of shades, and many are thermally stable and base stable. Tertiary amine catalysts (and residues thereof) do not appear to attack the aliphatic amino anthraquinone-based blue polymeric colorants, such as those disclosed in U.S. Pat. No. 4,137,243 to Farmer, and U.S. Pat. No. 4,846,846 to Rekers et al., noted above, to an extent to cause any appreciable color loss, some of such blue colorants have a tendency to lose color strength in (and thus exhibit a loss in stability within) polyurethane foam systems utilizing an elevated isocyanate index (e.g., an excess of isocyanate constituent in an amount above about 8% by total weight) and/or to the high exotherm generated during target foam formation, thus limiting their widespread use within polyurethanes in general. Therefore, improved blue colorants polyurethane foam products are highly desired to the extent that they exhibit versatility in both tertiary amine-catalyzed foams and high diisocyanate index foams, as well as other foam types. To date, the best blue polymeric colorants for such a purpose are those noted above which, although they exhibit excellent stability within certain polyurethane media, and other like properties, they also exhibit a certain lack of versatility such that their use is limited to specific targeted foam types.

Specifically, 1,4-alkylamino anthraquinone colorants have been used in plastics industry due to their unique bright mid-range blue shade and relatively high stability in polymer systems. In the polyurethane industry, certain anthraquinone-based blue polymeric colorants were developed that could withstand such catalyst attack problems. Although such anthraquinone-type polymeric colorants (such as Reactint® Blue X17, from Milliken Chemical) are brilliant in shade and less susceptible to degradation due to amine catalyst residues, these previously used polymeric anthraquinones suffer similar degradation characteristics as a result of the presence of higher levels of diisocyanate (hereinafter, "High TDI Index", basically an amount in excess of about 8 weight percent of isocyanate within the entire polyurethane formulation) within the target polyurethane foam pre-cursor formulation (such foams are produced, generally, through the reaction of an isocyanate and a polyol) or the like due to the reaction of exposed N—H on the color chromophore structure with the excess of highly reactive isocyanate. Thus these types of blue colorants could not be used in a lot of so-called "hot" formulations, although they are highly desired for unique applications.

Attempts have been made to overcome this problem. Such as those disclosed in U.S. Pat. No. 4,846,846 to Rekers, by using the polymeric blue colorants obtained from the reaction of quinonizarin and leucoquinonizarin with proper polyoxyalkylenated hindered alkylamines. Although such blue colorants have the desired stability towards excess isocyanates, the polyoxyalkylenated secondary alkylamines are not commercially available and are difficult to prepare thus the cost of the final products (blue colorants) are extremely high, make them be a cost prohibitive choice for polyurethane industry. Other attempts have also been tried including polyoxyalkylenated arylamino anthranquinone-based blues disclosed in U.S. Pat. No. 6,528,564 to Xia. Although this specific type of arylamino anthranquinone chromophore is stable towards excess of isocyanate, the shade is too dull to achieve brilliant mid-range blue shades in polyurethane articles.

It is known in the literature that anthraquinone-based dyes containing at least one active hydrogen atom could be co-polymerized with ester monomers such as dimethyl terephthalate to form colored solid polyester concentrates, such as those disclosed in U.S. Pat. No. 4,999,418 to Krutak et al. and U.S. Pat. No. 5,032,670 to Parham, both directed toward color concentrates for polyester articles. It is also known in European Patent 0,333,337B1 to McClelland et al., that anthraquinone-based dyes containing at least one active hydrogen atom can be reacted with lactones or hydroxyalkanoic acids to form colored thermal transfer sheets in which the product obtained from the reaction of anthraquinone-based dyes with lactones are solid crystal polymers. As noted above, no teaching or fair suggestion of a liquid reactive hydroxy-terminated polymeric 1,4-dialkylamino anthraquinone colorant bearing polyester chains is known. Nor is there taught nor fairly suggested that such a liquid polymeric colorant can be prepared directly from the reaction of quinizarin and leucoquinizarin and hydroxy-terminated alkylamine through a "one-pot" no-solid-intermediate-isolation process. Furthermore, there is no teaching nor fair suggestion for using such a resultant polymeric colorant to color thermosets such as polyurethanes.

To date, although some liquid colorants (other than less-than-reliable pigment dispersions) have been developed for such target end-uses, unfortunately, as noted above, they have also exhibited certain limitations. Improvements to such technology, such as a new polymeric liquid blue colorant based on hindered aliphatic amino anthranquinone bearing active hydrogen, such as OH, NH, $NH_2$ or SH group(s) terminated polyester chain(s), that provides effective colorations for such myriad end-uses as noted above and that exhibit brilliant blue colorations, lightfastness, thermal stability, base stability, compatibility with other coloring agents, at least, is thus highly desired. Particularly desired are colorants that are stable in the presence of excess isocyanate during polyurethane formation. Again, to date, there have been no teachings or fair suggestions of such a highly desirable, specific potentially polymeric liquid blue colorant within the pertinent prior art or within the colorant industry itself. As a result, any marked improvements in such a manner are of utmost importance within the polyurethane foam production industry.

DESCRIPTION OF THE INVENTION

It has thus now been determined that hydroxy group(s)-terminated polyester chain(s) attached, through a suitable linking group (or groups), such as alkylamino group(s), to the 1-position, the 4-position, or both positions, of an anthraquinone backbone provides such a needed and highly desired liquid blue colorant, particularly for utilization within thermoset (polyurethanes, for example) applications. It is thus an object of the invention to provide such a colorant exhibiting (at least) excellent blue colorations, low extraction, amine/base stability, thermal stability, optionally high TDI Index stability, and lightfastness within target thermoset articles. Another object of this invention is to provide a blue anthraquinone polymeric colorant having at least one hydroxy group-terminated polyester chain attached thereto, wherein said polymeric colorant can be tailored for ease of processing, ease of mixing within target thermoset media, and provides excellent colorations within the target finished articles.

It is to be understood that the term alkyl as used throughout is intended to encompass any straight or branched alkyl moiety, having anywhere from 1 to 30 carbons therein; the same chain length applies to the term "alkoxy" as well. The term "polyester" is intended to encompass any polymer or copolymer with repeating units of ester groups. Also, the terms substituted phenyl and substituted polyphenyl are intended to encompass any phenyl system having any type of pendant group attached thereto, including, without limitation, alkyl groups, alkylene groups, alcohol groups, ether groups, ester groups, amine groups, amide groups, hydroxyls, and the like. Phenyl is basically an unsubstituted ring system (and thus includes hydrogens only).

The invention itself encompasses a new compound as well as new synthetic procedure to produce a blue anthraquinone colorant exhibiting the needed characteristics for proper polyurethane article utilization. The synthetic procedure and compounds are as described in Scheme (I):

In the above Formulas (I) to (V), $R_1$ is a group selected from a hydrogen, an alkyl group having from 1 to 10 carbon atoms, phenyl, substituted phenyl, or a group represented by Formula (VI)

(VI)

wherein $R_2$ and $R_4$ are the same or different and are selected from the group consisting of H, alkylene radicals having from 1 to 10 carbon atoms, phenyl or substituted phenyl radicals; $R_3$ is a group selected from a H, an alkyl group having 1 to 10 carbon atoms, phenyl or substituted phenyl groups, or a group represented by Formula (VII)

$$-R_4-OH \quad (VII)$$

wherein $R_4$ is defined as above; wherein $R_5$ and $R_6$ are independently selected from a H, an alkyl group having 1 to 10 carbon atoms; wherein $R_7$ is a group selected from a hydrogen, an alkyl group having from 1 to 10 carbon atoms, phenyl, substituted phenyl, or a group represented by Formula (VIII)

(VIII)

wherein $R_8$ is a group selected from a H, an alkyl group having from 1 to 10 carbon atoms, phenyl, substituted

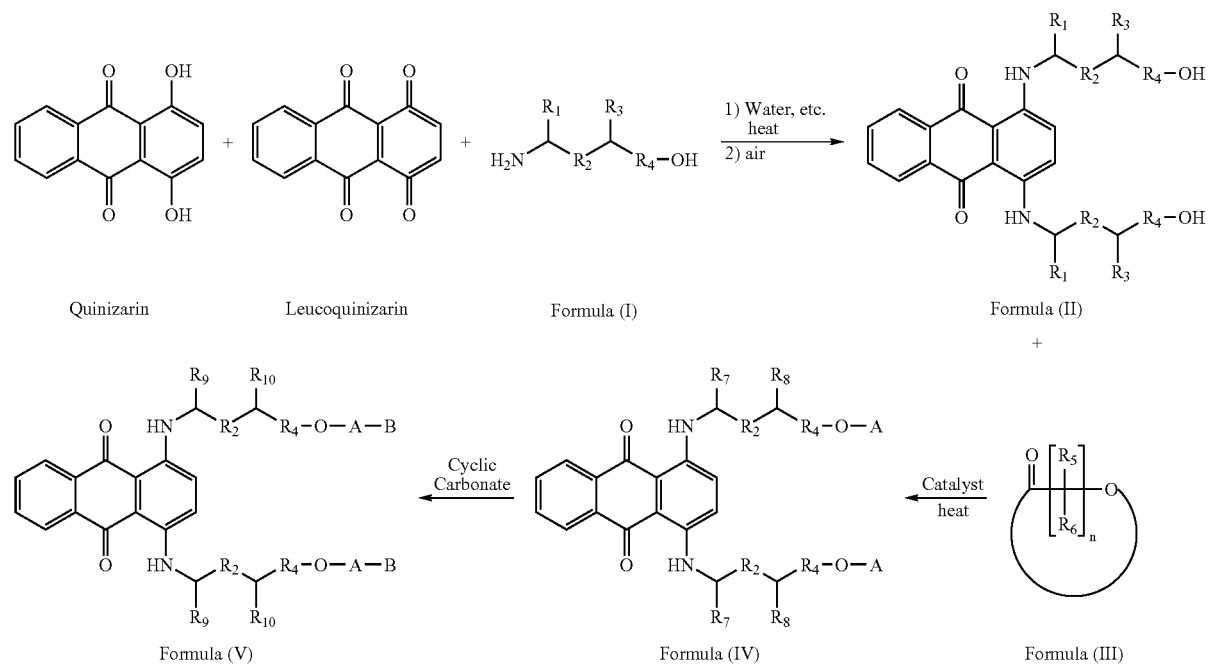

Scheme (I)

phenyl, or a group represented by Formula (VII), above; wherein A is a group selected from structures represented by Formulas (X) and (XI)

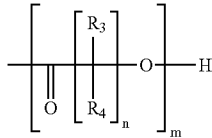 (X)

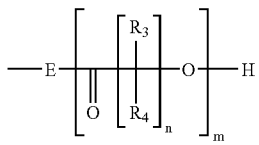 (XI)

wherein n is an integer of 1 to 10, preferably 3 to 8; m is any positive number including integer and fraction from 1 to 20, such as 1, 1.2, or 3, and the like; E is a group selected from structures represented by Formula (XII)

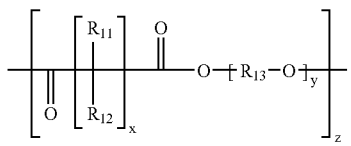 (XII)

wherein $R_{11}$ and $R_{12}$ are independently selected from a H, an alkyl group having 1 to 10 carbon atoms, phenyl or substituted phenyl groups; $R_{13}$ is an alkyl radical having 2 to 5 carbon atoms, such as —$CH_2CH_2$—, —$CH(CH_3)CH_2$—, —$CH(CH_2CH_3)CH_2$—, and the like; x and y are independently selected from integers between/including 2 to 20; z is any positive number including integer and fraction from 0 to 20, such as 1, 1.2, 3, and the like; if z is 0, Formula (XI) is Formula (X); wherein $R_9$ is a group selected from hydrogen, an alkyl group having from 1 to 10 carbon atoms, phenyl, substituted phenyl, or a group represented by Formula (XIII)

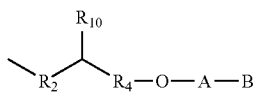 (XIII)

wherein $R_{10}$ is a group selected from a H, an alkyl group having from 1 to 10 carbon atoms, phenyl, substituted phenyl, or a group represented by Formula (XIV)

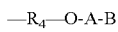 (XIV)

wherein B is a group selected from structures represented by Formulas (XV) and (XVI)

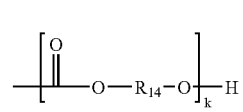 (XV)

(XVI)

and wherein $R_{14}$ is an alkylene radical or substituted alkylene radical having 2 to 10 carbons, such as —$CH_2CH_2$—, —$CH(CH_3)CH_2$—, —$CH(CH_2CH_3)CH_2$—, and the like; and k is any positive number including integer and fraction from 0 to 20, such as 1, 1.2, or 3 etc.

In Formula (III), the group

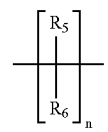

also includes the structure represented by Formula (XVII)

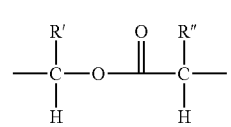 (XVII)

and within R' and R" are independently selected from a group consisted of a H, an alkyl group having from 1 to 10 carbon atoms, phenyl, substituted phenyl, etc. Thus, when R' and R" are both methyl, Formula (III) is lactide; whereas when R' and R" are both H, Formula (III) is glykolid (a.k.a. [1,4]dioxane-2,5-dione).

Scheme (I) listed above as one method of producing the inventive colorants, is more concisely described as follows, one preferred embodiment of practicing the invention thereof:

A mixture of quinizarin and leucoquinizarin, in the ratio of 0.5:1.0 to 5.0:1.0 by weight respectively, is reacted under heating, with appropriate hydroxyl-terminated hindered primary alkylamine, as exemplified in Formula (I), in the presence of water, with or without polyalkyleneoxide derivatives or liquid polyesters such as Fomrez® (from Witco) or the like, and with or without boric acid. Upon air oxidation, an AQ blue dye derivative as exemplified in Formula (II), is synthesized. The completion of this reaction is monitored by UV-vis. A shade ratio Abs. $\lambda_{590\ nm}/\lambda_{636\ nm}$ of less than 0.9, preferably less than 0.85, most preferably less than 0.83 suggests the completion of the reaction. Dye derivative (II) co-exists as slurry with water, and with polyalkyleneoxide derivatives or the like, if they are so added into the mixture during the process of reaction. After the addition of liquid a low molecular weight polyester such as Bayer Rucoflex® S-2011-225 or Witco Fomrez® 11-225, or any liquid polyalkyleneoxide derivatives (to allow the formation of a dye/polyester or polyalkyleneoxide slurry to avoid solid handling) and strip off water, to the dye (IV)/polyester and/or polyalkyleneoxide derivatives slurry is added cyclic lactone as shown in Formula (III) and transesterification catalyst or ring-opening addition-polymerization catalyst. The mixture is then heated to produce a liquid or paste product or intermediate as exemplified by Formula (IV). If further modification is desired, at least one cyclic carbonate is added and allowed to react with derivatives as represented by Formula (IV), in the presence of transesterification catalysts (as mentioned above) or basic hydroxyalkylation catalysts (such as $K_2CO_3$, imidiazole, KF, triphenylphosphine, etc), to produce product as represented by Formula (V).

The above-mentioned hydroxyl-terminated hindered primary alkylamine of Formula (I) may be, specifically, 2-amino-1-butanol, 2-amino-1-pentanol, 2-amino-1-propanol, 2-amino-1,3-propanediol, and the like.

The above-mentioned polyalkyleneoxide derivatives may be, specifically, polyethyleneglycols with the molecular weight from 100 to 9000, alkyl-capped polyethyleneglycols with the molecular weight range from 100 to 9000, dialkyl-capped polyethyleneglycols with the molecular weight from 100 to 9000, polypropyleneglycols with the molecular weight from 100 to 9000, alkyl-capped polypropyleneglycols with the molecular weight from 100 to 9000, dialkyl-capped polypropyleneglycols with the molecular weight from 100 to 9000, other polyether polyols or the like.

At least one of the purposes of the addition of said polyalkyleneoxide derivatives and/or low molecular weight liquid polyesters is to avoid the handling of solid intermediate Formula (II) in the process. Thus intermediate Formula (II) forms a slurry suspension with water and liquid polyester and/or polyalkyleneoxide derivatives in the condensation step and in the air oxidation step; and forms a slurry with liquid polyester and/or polyalkyleneoxide after removing water.

The above-mentioned low molecular weight polyester may be, specifically, the copolymer of adipic acid with alkyl diol such as ethylene glycol, diethylene glycol, triethylene glycol, propylene glycol, dipropylene glycol, tripropylene glycol or the like. The molecular weight of said liquid polyester may be range from 200 to 2000, preferably 300 to 1000. More specifically, the low molecular weight liquid polyester may be Bayer's Rucoflex® S-2011-225, Witco's Fomrez® 11-225, and the like.

The above-mentioned lactone of Formula (III) may be, specifically, ε-caprolactone, trimethyl-ε-caprolactone, monomethyl-ε-caprolactone, γ-butyrolactone, δ-valerolactone, lactide, [1,4]dioxane-2,5-dione, and the like.

The catalyst that may be used for the ring-opening addition-polymerization or transesterification are, for example, tetraethyl-titanate, tetrabutyl-titanate, tetrapropyl-titanate, or other organic titanate compounds, stannous octoate, dibutyl-tin-oxide, dibutyl-tin-dilaurate, a n-butyl-tin tris(alkanoate) or other organic tin compounds, stannous chloride, stannous bromide, stannous iodide or other stannous halide compounds.

The above-mentioned cyclic carbonate may be, specifically, ethylene carbonate, propylene carbonate, butylenes carbonate or the like.

The amount by weight of the condensation catalyst boric acid added can be range from 0-100% based on the amount by weight of hydroxyl-terminated hindered primary amine used. This condensation reaction of making intermediate Formula (II) occurs with or without boric acid, but a small amount of boric acid, such as 0.1-20%, preferably 0.2-5% based on the amount by weight of amine used, greatly speed up the reaction. More than 100% boric acid will not be economic for this process.

The amount by weight of ring-opening addition-polymerization catalyst added is 0.1-10,000 ppm and preferably 1-5000 ppm based on the amount by weight of amine used. When the amount of catalyst is less than 0.1 ppm, the ring-opening reaction of the lactones is remarkably slown down which is not economically interesting. On the other hand, when the amount of catalyst is more than 10,000 ppm, the ring-opening reaction occurs quickly but residue catalyst left in the final product affect polyurethane resin physical properties.

The reaction temperature for the condensation reaction to make intermediate Formula (II) is 50-150° C., and preferably 70-130° C., and most preferably 85-100° C.

The reaction temperature for the ring-opening polymerization to make product or intermediate Formula (IV) is 70-220° C., and preferably 80-180° C., most preferably 100-160° C.

The reaction temperature for the ring-opening polymerization or hydroxyalkylation using cyclic carbonate to make product Formula (V) is 60-200° C., and preferably 80-180° C., most preferably 100-160° C.

The inventive polymeric liquid blue colorant may be a stable mixture consisting of various amount of compounds as exemplified in Formula (V), or compounds exemplified in Formula (IV), with or without small amount of compounds exemplified in Formula (II), with or without polyalkyleneoxide derivatives, with or without low molecular weight liquid polyesters, with or without residue lactone as Formula (III), and with or without residue cyclic carbonate, or other like compounds.

Polyol compositions and/or isocyanate compositions (as polyurethane precursors), as well as polyurethane articles, comprising at least one such compound conforming to the broad structure of Formulas (IV) and/or (V) are also encompassed within this invention, particularly those comprising such compounds and other coloring agents and other additives such as antioxidants, UV absorbers, flame retardants, light stabilizers, catalysts, surfactants, blowing agents, and the like, to effectuate the formation of thermosets such as polyurethane foams. Methods of making such thermoset compositions and articles, such as polyurethane slabstock foam, as one non-limiting example, comprising at least one of such compound conforming to Formulas (IV) and/or (V), above, are also contemplated within this invention.

Also encompassed within this invention is a method of producing a polyurethane article comprising the steps of: a) providing a polyol composition; b) providing an isocyanate composition; wherein at least one of the compositions of steps "a" and "b" comprises at least one blue polymeric anthraquinone colorant conforming to Formulas (IV) and/or (V), above; and c) reacting all of the compositions from steps "a", and "b", together in the presence of a catalyst, optionally in the presence of an amount of isocyanate in excess of 8% (preferably 15% or greater) by weight of the total reaction mixture. A colored polyurethane article, preferably, though not necessarily, a foam article, produced by these methods is also contemplated within this invention, particularly in the presence of either of said tertiary amine hydroxy-containing catalyst and/or in the presence of such a large amount of isocyanate (including mono, di, and/or polyisocyanates) reactant.

In general, polyurethane foam is produced through the catalyzed polymerization of the reaction products of polyols and isocyanates. Such a reaction is well known throughout the polyurethane industry and has been practiced for many years. The potential number and types of polyols utilized within this invention are plentiful. Such a compound is defined as comprising at least two alcohol moieties, preferably at least three. The free hydroxyl groups react well with the isocyanates to form the urethane components that are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred is a typical trifunctional polyol, such as F3022 polyol, available from Bayer.

Isocyanates, most preferred diisocyanates, are well known components of such polyurethane foams and include any compounds which possess at least one free cyanate reactive group, and most preferably two, although more may be utilized. Such compounds may also be aliphatic or aromatic in nature. The most prominently utilized isocyanates, and thus the most preferred types for this invention, are toluene diisocyanate (TDI), and diphenylmethane diisocyanate (MDI). The polyol is generally reacted with a slight excess of isocyanate (ratio of from 1:0.85 to 1:1.25) to produce a soft flexible foam product; the greater the ratio, the harder the produced foam). For rigid foams the excess isocyanate index is substantially higher (1:2.0 to 1:4.0). In practice, two separate streams of liquids (one of polyol, the other of isocyanate) are mixed together in the presence of a polymerization catalyst and a blowing agent in order to produce the desired polyurethane foam product. As noted above, regular polymeric anthraquinone blue colorants, including aliphatic amino anthraquinones appear to react with such excess amounts of isocyanate and exhibit loss of color and/or change of hue in the final target polyurethane articles.

As noted above, this invention is directed to polyurethanes in general, with foam articles most preferred. Thus, laminates, solid articles, and any other type of colored polyurethane, is encompassed within this invention.

The term "tertiary amine-based hydroxy-containing catalyst" is intended to encompass any reactive amine catalysts including the gelation/blowing catalysts utilized within polyurethane production which comprises at least one amine constituent. As noted above, amine-based catalysts, and more specifically, tertiary amine catalysts, are widely utilized within such specific foam-producing methods. Two catalysts, in particular, DABCO TL and DMEA, are excellent gelation/blowing catalysts for this purpose. The amount of tertiary amine hydroxy-containing catalyst required to effectuate the desired urethane polymerization is extremely low, from between 0.05 php to about 1.00 php of the entire foam-making composition; more specifically, such a range is from about 0.07 php to about 0.60 php. Even though the number of free amines available is quite low, their ability to deleteriously affect the final foam product within colorants, polyols, and other additives, is pronounced upon exposure to high temperature during polymerization.

Other coloring agents may be also added within the different streams prior to reaction and/or polymerization as well. Such additions are well known within the industry to produce colored polyurethane foam articles in various colors and shades. Thus, the term "coloring agent" is intended to encompass any pigment, pigment dispersion, polymeric colorant (other than the required at least one anthraquinone type), dye, dyestuff, any mixtures thereof, and the like, which provides desirable colorations to target polyurethane foam articles. In general, such coloring agents are added to the polyol stream (prior to reaction with the isocyanate) in amounts ranging from about 0.001 php to about 10 php. Suitable pigments for this invention include, without limitation, carbon black, lamp black, titanium dioxide, phthalocyanine, and the like. Suitable polymeric colorants for this purpose are disclosed within U.S. Pat. No. 4,284,279 to Cross et al., again without any limitation, and as merely examples. Suitable dyes and dyestuffs include reactive dyes, solvent dyes, vat dyes, and the like.

Other additives or solvents may also be present within the foam-making composition. Auxiliary blowing agents are required to provide the necessary foam blowing capability and reduce chances of combustion. Such compounds include methylene chloride, acetone, carbon dioxide (which may be liberated during the reaction between water and isocyanate), and the like, and are present in amounts of between about 1.0 php and 10 php of the entire foam-making composition. Water may thus also be added in relatively low amount (i.e., from about 1.5 to about 10 php; most preferably between about 3 and 5.5 php) to provide carbon dioxide for blowing purposes. Silicones may be added to provide desired cell structure and foam stability and are present in an amount from about 0.1 to about 2 php of the entire foam-making composition; preferably from about 0.5 to about 1.6 php.

The term "pure, undiluted state" as used in conjunction with the inventive colorant compounds indicates that the compounds themselves without any additives are liquid at room temperature or which thus encompasses all types that exhibit viscosities of at most 100,000 cps at room temperature or meet such viscosity limits upon exposure to temperatures of at most about 40° C. and which remain within said low viscosity range thereafter for at least 24 hours upon cooling to room temperature. Thus, there is no need to add solvents, viscosity modifiers, and other like additives to the compounds to effectuate such a desirable physical state.

The presence of surfactants, solvents, and the like, may be utilized to alter the solubility, coloring characteristics, and the like, of the ultimate inventive polymeric anthraquinone colorant which would be understood and appreciated by the ordinarily skilled artisan within this particular art.

The colorant compounds of Formulas (IV) and (V), above, are, again, liquid in their pure, undiluted state; however, pasty or waxy colorants are also encompassed within this invention, due to their handling improvement over clearly solid colorants of similar structures.

PREFERRED EMBODIMENTS OF THE INVENTION

The following non-limiting examples are merely intended to provide preferred embodiments of the practice and/or utility of this invention and are not intended to encompass the entire scope of the invention.

SYNTHETIC EXAMPLES

Example 1

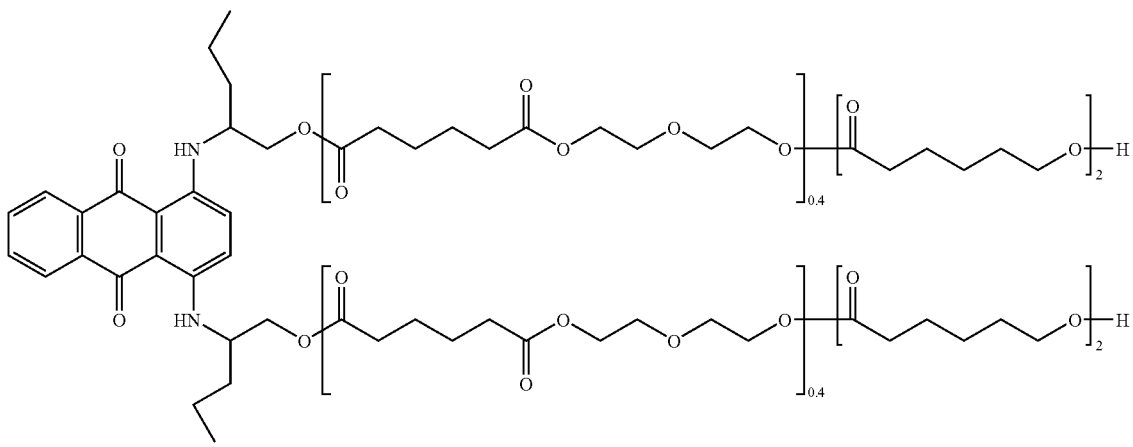

To a 100 mL 3-neck round-bottom flask equipped with a mechanical stirrer, a thermal controller and a reflux condenser, were charged 8.86 g (37 mmol) of quinizarin, 2.88 g (12 mmol) of leucoquinizarin, 1.0 g (5 mmol) of PEG 200 and 62 mg (1 mmol) of boric acid. 10.0 g (97 mmol) of 2-amino-1-pentanol and 30 mL of water were added under nitrogen and the reaction was heated to 95° C., and monitored by UV-vis. The reaction was complete (UV-vis in MeOH, Abs. $\lambda_{591\,nm}/\lambda_{637\,nm}=0.82$) after 17 hours of heating. 10 g (20 mmol) of Fomrez® 11-225 (Witco) was added. The reaction was oxidized by air for 14 hours while the temperature was kept below 75° C. Then the temperature was raised to 120° C. for 1.5 hours and the water was removed under vacuum. The reaction mixture was then charged with 23 g (200 mmol) of ε-caprolactone and 0.07 g of Ti(OBu)$_4$. The mixture was heated to 120° C. under air for 27 hours. 48.7 g of liquid blue colorant was obtained with color strength of 11.2 abs./g/L (MeOH) and the maximum absorbency at 635 nm. 84.2% transesterification was obtained based on HPLC analysis.

Example 2

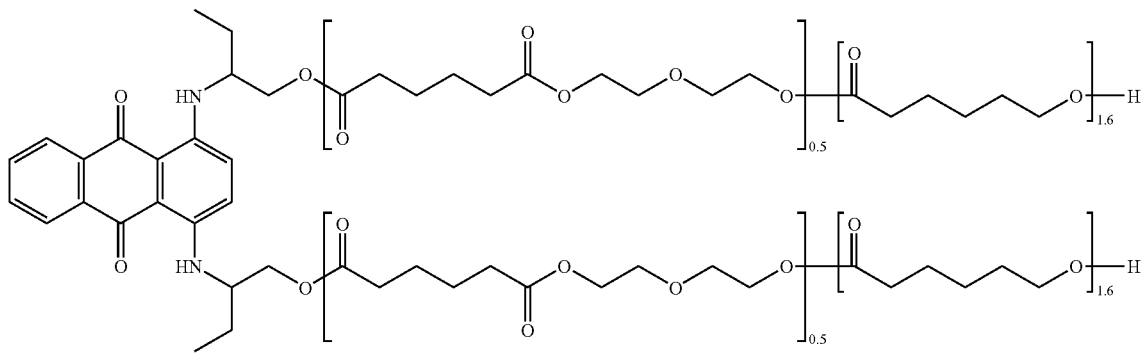

To a 1000 mL 3-neck round-bottom flask equipped with a mechanical stirrer, a thermal controller and a reflux condenser, were charged 72 g (0.3 mol) of quinizarin, 24.2 g (0.1 mol) of leucoquinizarin, 10 g (50 mmol) of PEG 200 and 0.24 g (4 mmol) of boric acid. 72 g (0.81 mol) of 2-amino-1-butanol and 200 mL of water were added under nitrogen and the reaction was heated to 95° C., and monitored by UV-vis. The reaction was complete (UV-vis in MeOH, Abs. $\lambda_{590\ nm}/\lambda_{639\ nm}$<0.81) after 20 hours of heating. 100 g (0.2 mol) of Fomrez® 11-225 (Witco) was added. The reaction was oxidized by air for 2 hours while the temperature was kept at 70° C. Then the temperature was raised to 95° C. for 6 hours and the water was removed under vacuum. The reaction mixture was then charged with 145 g (1.27 mol) of ε-caprolactone and 0.6 g of Fastcat® FC 9102 (ATOFINA). The mixture was heated to 120° C. under nitrogen for 26 hours and the reaction is monitored by HPLC. 369 g of homogeneous liquid blue colorant was obtained with color strength of 15.9 abs./g/L (MeOH, Abs. $\lambda_{590\ nm}/\lambda_{634\ nm}$=0.86) and the maximum absorbency at 634 nm. 80% transesterification was obtained based on HPLC analysis.

Example 3

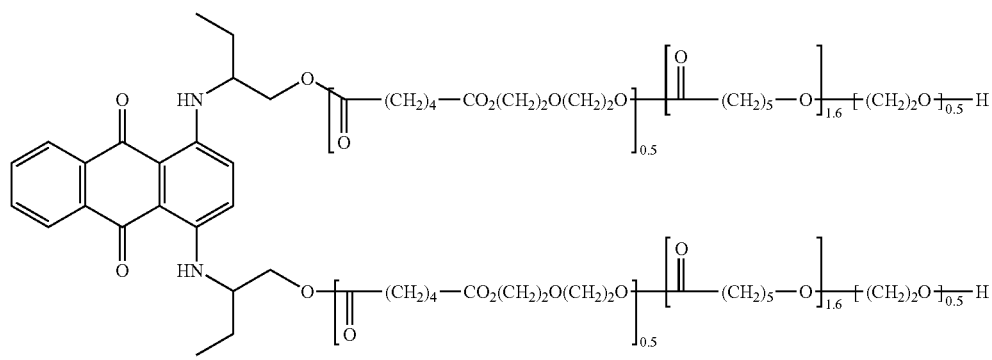

200 g of the blue colorant from Example 2, was reacted with 20 g of ethylene carbonate (Jeffsol® EC from Huntsman) in the presence of 1 g of Imidizole at 120 C for 6 hours. 211 g of homogeneous liquid blue colorant was obtained with color strength of 14.8 abs./g/L (MeOH, Abs. $\lambda_{590\ nm}/\lambda_{634\ nm}$=0.87) and the maximum absorbency at 634 nm.

Example 4

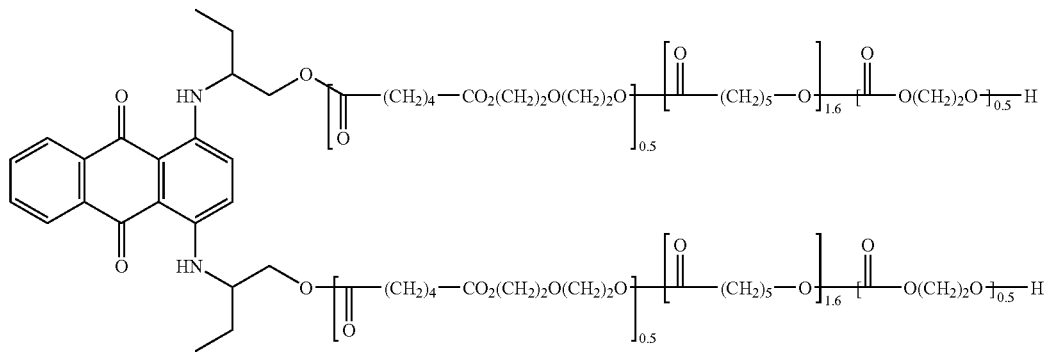

200 g of the blue colorant from Example 2, was reacted with 20 g of ethylene carbonate (Jeffsol® EC from Huntsman) in the presence of 0.4 g of Fastcat® FC 9102 at 120 C for 7 hours. 215 g of homogeneous liquid blue colorant was obtained with color strength of 14.4 abs./g/L (MeOH, Abs. $\lambda_{590\,nm}/\lambda_{634\,nm}=0.87$) and the maximum absorbency at 634 nm.

Example 5

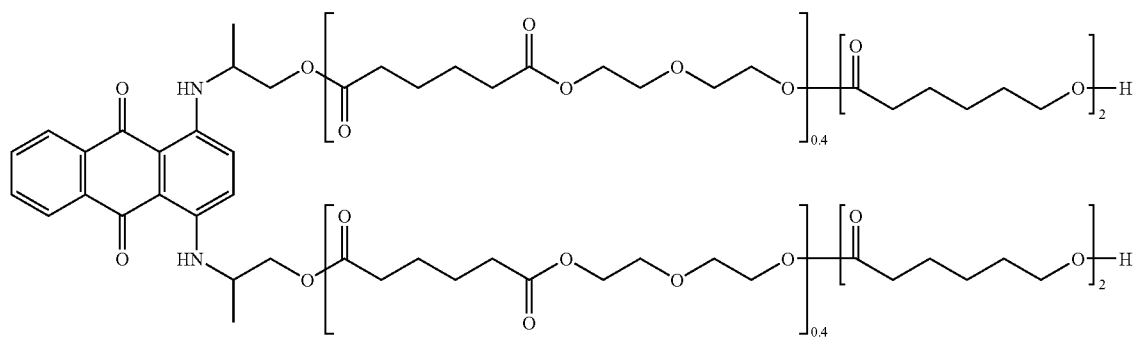

To a 100 mL 3-neck round-bottom flask equipped with a mechanical stirrer, a thermal controller and a reflux condenser, were charged 17.8 g (74 mmol) of quinizarin, 6.0 g (25 mmol) of leucoquinizarin, 2.0 g (10 mmol) of PEG 200 and 0.12 mg (2 mmol) of boric acid. 15.0 g (200 mmol) of 2-amino-1-propanol and 50 mL of water were added under nitrogen and the reaction was heated to 95° C., monitored by UV-vis. The reaction was complete (UV-vis in MeOH, Abs. $\lambda_{589\,nm}/\lambda_{635\,nm}=0.87$) after 17 hours of heating. 20 g (40 mmol) of Fomrez® 11-225 was added. The reaction was oxidized by air for 14 hours while the temperature was kept below 75° C. Then the temperature was raised to 120° C. under vacuum for 0.5 hours. The reaction was charged with 46 g (400 mmol) of ε-caprolactone and 82 mg of Fascat® FC 9102 (ATOFINA). The mixture was heated to 120° C. under air for 45 hours. 97.7 g of liquid blue colorant was obtained with color strength of 14.1 abs./g/L (MeOH) and the maximum absorbency at 632 nm. 76.6% polyesterificaiton was obtained based on HPLC analysis.

Example 6

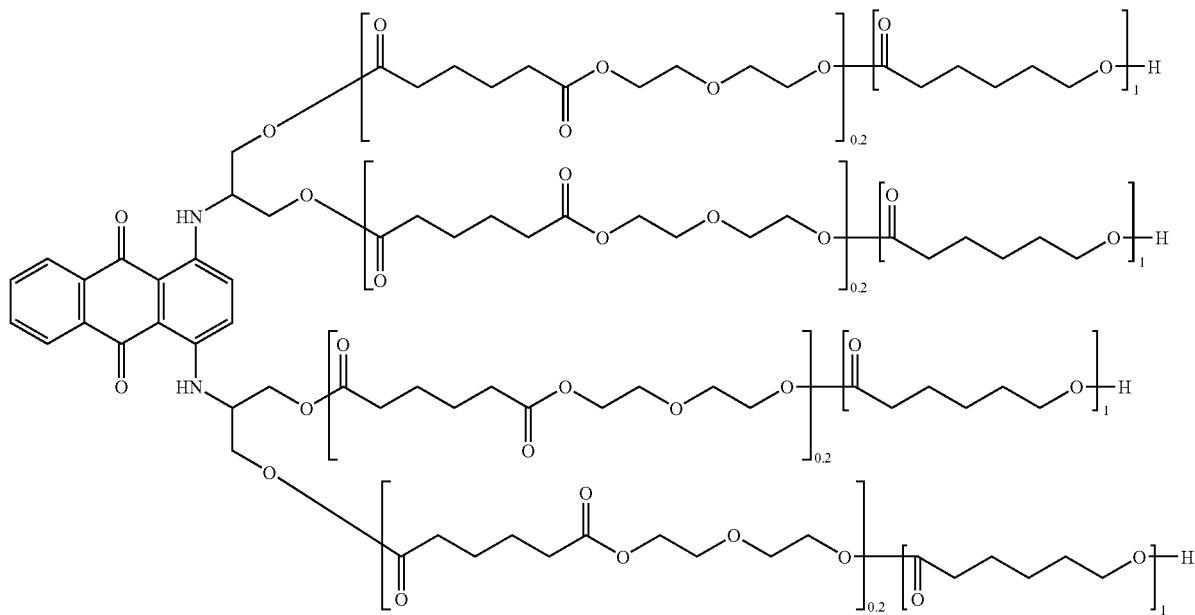

Fascat® Process: To a 100 mL 3-neck round-bottom flask equipped with a mechanical stirrer, a thermal controller and a reflux condenser, were charged 9.18 g (38.3 mmol) of quinizarin, 3.05 g (12.6 mmol) of leucoquinizarin, 1.0 g (5 mmol) of PEG 200 and 62 mg (1 mmol) of boric acid. 10 g (110 mmol) of 2-amino-1,3-propanediol and 50 mL of water were added under nitrogen and the reaction was heated to 95° C., monitored by UV-vis. The reaction was complete (UV-vis in MeOH, Abs. $\lambda_{588\ nm}/\lambda_{634\ nm}$=0.89) after 30 hours of heating. 10 g (20 mmol) of Fomrez® 11-225 was added. The reaction was oxidized by air for 14 hours while the temperature was kept below 75° C. Then the temperature was raised to 120° C. for 1.5 hours under vacuum to remove water. The reaction was charged with 23 g (200 mmol) of ε-caprolactone and 0.08 g of Fascat® FC 9102 (ATOFINA). The mixture was heated to 120° C. under air for 46 hours. 43.5 g of liquid blue colorant was obtained with color strength of 11.3 abs./g/L (MeOH) and the maximum absorbency at 632 nm. 65.8% polyesterificaiton was obtained based on HPLC analysis.

Example 7

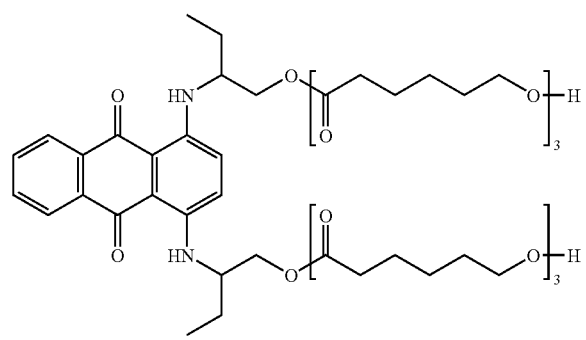

To a 1 L 3-neck round-bottom flask equipped with a mechanical stirrer, a thermal controller and a reflux condenser, were charged 72 g (0.3 mol) of quinizarin, 24.2 g (0.1 mol) of leucoquinizarin, 60 g (0.24 mol) of PEG-OMe and 0.25 g (4 mmol) of boric acid. 72 g (0.81 mol) of 2-amino-1-butanol and 200 mL of water were added under nitrogen and the reaction was heated to 95° C., monitored by UV-vis. The reaction was complete (UV-vis in MeOH, Abs. $\lambda_{590\ nm}/\lambda_{636\ nm}$=0.84) after 21 hours of heating. Water was removed at 80° C. by vacuum. The reaction was charged with 273.6 g (2.4 mol) of ε-caprolactone and 0.60 g of Fascat® FC 9102. The mixture was heated to 120° C. under air for 27 hours. 480.5 g of liquid blue colorant was obtained with color strength of 13.4 abs./g/L (MeOH) and the maximum absorbency at 634 nm. 100% polyesterification was obtained based on HPLC. Upon cool down to room temperature, 400 g of water was added, and the mixture was adjusted to pH ~7. The mixture was then heated to 70 C for phase separation, and the product layer was collected and stripped off water, 410 g of liquid blue colorant was obtained with color strength of 14.8 abs./g/L (MeOH) and the maximum absorbency at 634 nm.

Example 8

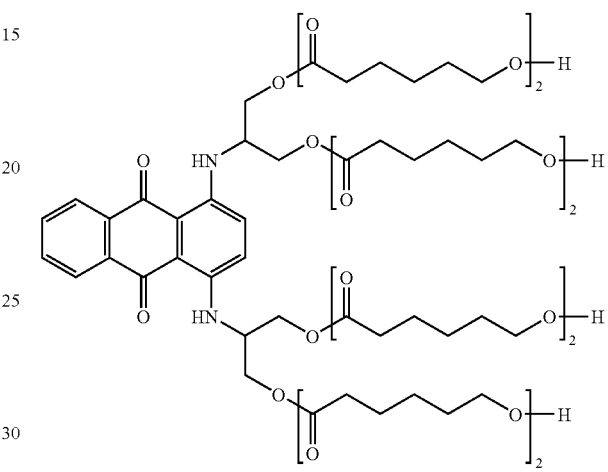

To a 100 mL 3-neck round-bottom flask equipped with a mechanical stirrer, a thermal controller and a reflux condenser, were charged 9.89 g (41.2 mmol) of quinizarin, 3.32 g (13.7 mmol) of leucoquinizarin, 10 g (40 mmol) of PEG-OMe (Mw 250) and 62 mg (1 mmol) of boric acid. 10 g (110 mmol) of 2-amino-1,3-propanediol and 50 mL of water were added under nitrogen and the reaction was heated to 95° C., monitored by UV-vis. The reaction was complete (UV-vis in MeOH, Abs. $\lambda_{588\ nm}/\lambda_{634\ nm}$=0.89) after 22 hours of heating. Water was removed by vacuum. The reaction was charged with 50.2 g (440 mmol) of ε-caprolactone and 0.08 g of Fascat® FC 9102. The mixture was heated to 120° C. under air for 27 hours. 78.4 g of liquid blue colorant was obtained with color strength of 7.6 abs./g/L (MeOH) and the maximum absorbency at 632 nm. 92.6% polyesterification was achieved based on HPLC.

Example 9

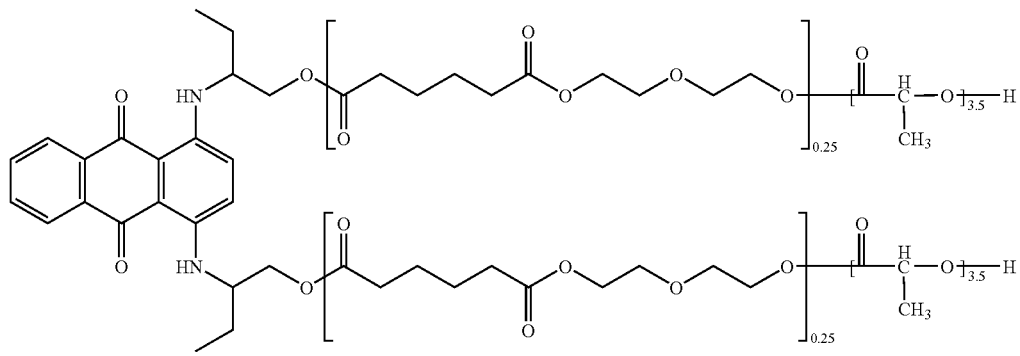

To a 1000 mL 3-neck round-bottom flask equipped with a mechanical stirrer, a thermal controller and a reflux condenser, were charged 72 g (0.3 mol) of quinizarin, 24.2 g (0.1 mol) of leucoquinizarin, 10 g (50 mmol) of PEG 200 and 0.24 g (4 mmol) of boric acid. 72 g (0.81 mol) of 2-amino-1-butanol and 200 mL of water were added under nitrogen and the reaction was heated to 95° C., and monitored by UV-vis. The reaction was complete (UV-vis in MeOH, Abs. $\lambda_{590\ nm}/\lambda_{639\ nm}$<0.81) after 20 hours of heating. 50 g (0.1 mol) of Fomrez® 11-225 (Witco) was added, and the mixture was stripped off water under vacuum at 95 C.

The reaction residue was then charged with 500 g of toluene and 200 g (1.39 mol) of lactide and 0.6 g of Fastcat® FC 9102 (ATOFINA). The mixture was heated to 100° C. under nitrogen for 16 hours and the reaction is monitored by HPLC. After removing toluene, the mixture was added 400 ml of water, adjusted pH to 7. Upon heating to 70 C, the product layer was separated and stripped off water. 320 g of homogeneous liquid blue colorant was obtained with color strength of 20.1 abs./g/L (MeOH, Abs. $\lambda_{590\ nm}/\lambda_{634\ nm}$=0.88) and the maximum absorbency at 634 nm.

Example 10

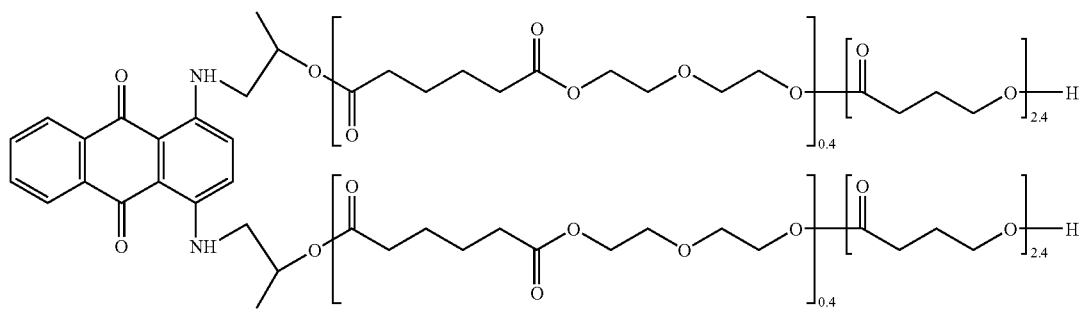

To a 500 mL 3-neck round-bottom flask equipped with a mechanical stirrer, a thermal controller and a reflux condenser, were charged 77.0 g (0.32 mol) of quinizarin, 24.2 g (0.10 mol) of leucoquinizarin, 10 g (0.05 mol) of PEG 200. 67 g (0.85 mol) of 1-amino-2-propanol and 200 mL of water were added under nitrogen and the reaction was heated to 95° C., monitored by UV-vis. The reaction was complete (UV-vis in MeOH, Abs. $\lambda_{591\ nm}/\lambda_{637\ nm}$=0.82) after 21 hours of heating. 100 g (0.20 mol) of fomrez® 11-225 was added. Water was removed at 80 C under vacuum. Then the temperature was raised to 120° C. and charged 172 g (2.0 mol) of γ-butyrolactone and 0.56 g of Ti(OBu)$_4$. The mixture was heated to 120° C. under air for 48 hours. 373 g of blue colorant was obtained as a paste with color strength of 13.3 abs./g/L (MeOH) and the maximum absorbency at 637 nm.

Example 11

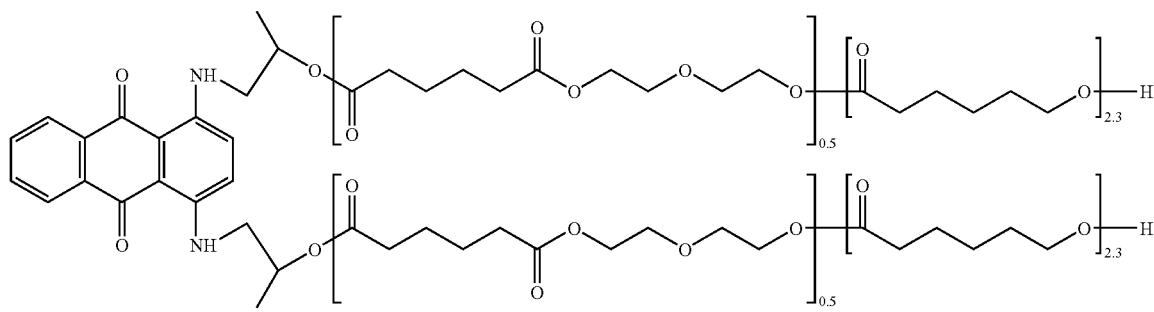

To a 250 mL 3-neck round-bottom flask equipped with a mechanical stirrer, a thermal controller and a reflux condenser, were charged 36.0 g (0.15 mol) of quinizarin, 12.1 g (0.05 mol) of leucoquinizarin, 6.0 g (30 mmol) of PEG 200. 30 g (0.40 mol) of 1-amino-2-propanol and 100 mL of water were added under nitrogen and the reaction was heated to 95° C., monitored by UV-vis. The reaction was complete (UV-vis in MeOH, Abs. $\lambda_{591\ nm}/\lambda_{637\ nm}=0.82$) after 22 hours of heating. 50 g (0.10 mol) of Fomrez® 11-225 was added. Water was removed at 80° C. under vacuum. Then the temperature was raised to 120° C. and charged 106 g (0.93 mol) of ε-caprolactone and 0.30 g of Fascat® FC 9102. The mixture was heated to 120° C. for 29 hours. 228 g of liquid blue colorant was obtained with color strength of 14.0 abs./g/L (MeOH) and the maximum absorbency at 636 nm.

Example 12

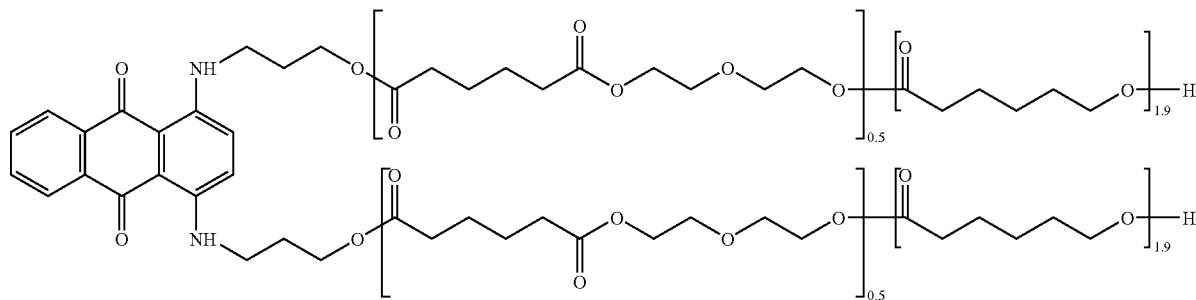

To a 500 mL 3-neck round-bottom flask equipped with a mechanical stirrer, a thermal controller and a reflux condenser, were charged 72.0 g (0.30 mol) of quinizarin, 24.2 (0.10 mol) of leucoquinizarin, 10.0 g (0.05 mol) of PEG 200. 61.2 g (0.82 mol) of 3-amino-1-propanol and 200 mL of water were added under nitrogen and the reaction was heated to 95° C., monitored by UV-vis. The reaction was complete (UV-vis in MeOH, Abs. $\lambda_{592\ nm}/\lambda_{639\ nm}=0.84$) after 21 hours of heating. The reaction was oxidized by air for 3 hours while the temperature was kept below 75° C. Then water was removed under the vacuum. 100 g (0.20 mol) of Fomrez® 11-225 was added and a paste was formed. The reaction was charged with 171 g (1.5 mol) of ε-caprolactone and 0.30 g of Fascat® FC 9102. The mixture was heated to 120° C. for 42 hours. 421 g of liquid blue colorant was obtained with color strength of 16.3 abs./g/L (MeOH) and the maximum absorbency at 638 nm. 81.4% transesterification was obtained based on HPLC analysis.

Example 13

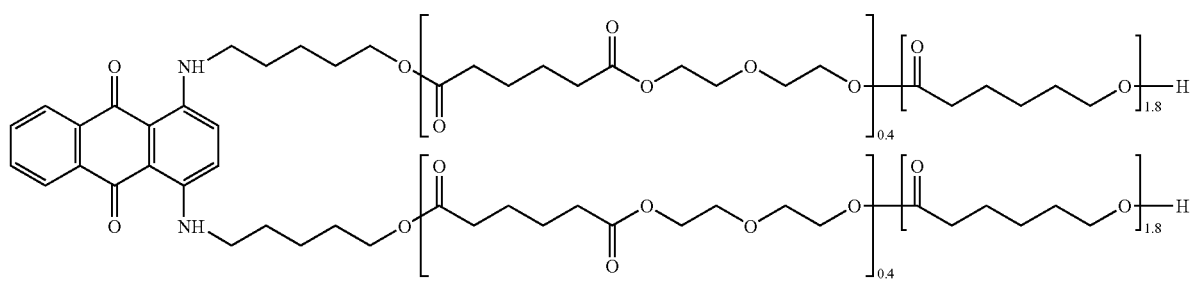

To a 100 mL 3-neck round-bottom flask equipped with a mechanical stirrer, a thermal controller and a reflux condenser, were charged 18.0 g (75 mmol) of quinizarin, 6.1 g (25 mmol) of leucoquinizarin, 2.0 g (10 mmol) of PEG 200. 22.5 g (218 mmol) of 5-amino-1-pentanol and 50 mL of water were added under nitrogen and the reaction was heated to 95° C., monitored by UV-vis. The reaction was complete (UV-vis in MeOH, Abs. $\lambda_{594\ nm}/\lambda_{640\ nm}=0.81$) after 23 hours of heating. The reaction was oxidized by air for 3 hours while the temperature was kept below 75° C. Then water was removed under the vacuum. 20 g (40 mmol) of fomrez 11-225 was added and a paste was formed. The reaction was charged with 40 g (351 mmol) of ε-caprolactone and 0.08 g of Fascat® FC-9102. The mixture was heated to 120° C. for 39 hours. 99 g of liquid blue colorant was obtained with color strength of 12.6 abs./g/L (MeOH) and the maximum absorbency at 640 nm. 81.5% transesterification was achieved based on HPLC analysis.

Example 14

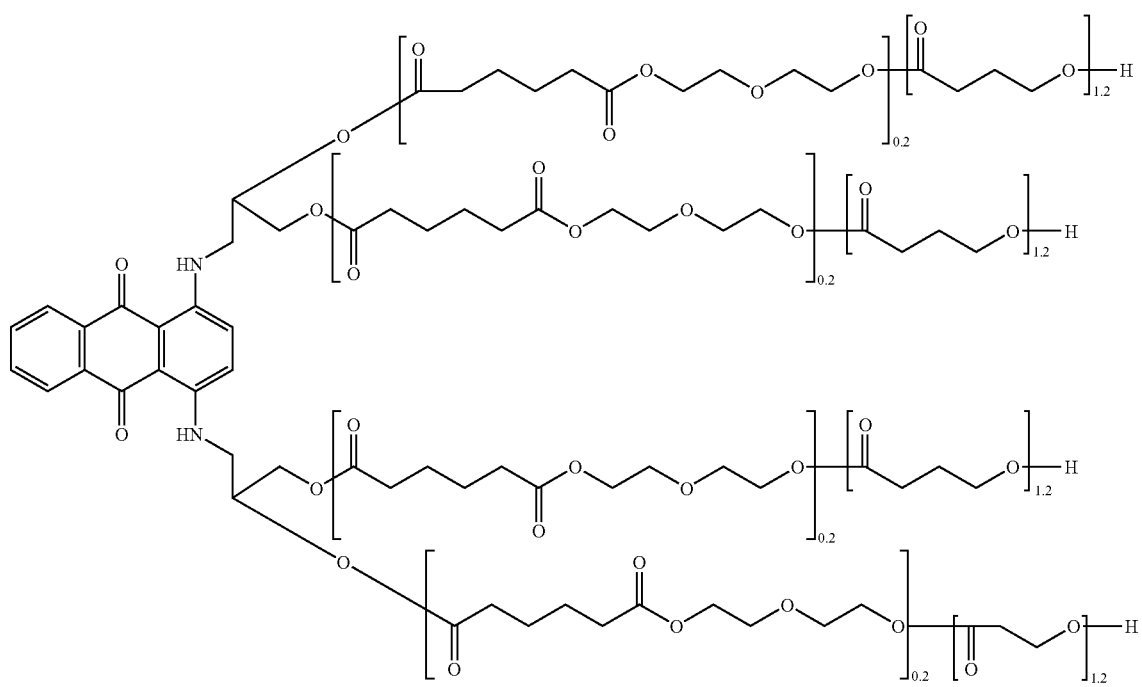

To a 250 mL 3-neck round-bottom flask equipped with a mechanical stirrer, a thermal controller and a reflux condenser, were charged 36.0 g (0.15 mol) of quinizarin, 12.1 g (0.05 mol) of leucoquinizarin, 4.0 g (20 mmol) of PEG 200. 37.0 g (0.406 mol) of 3-amino-1,2-propanediol and 100 mL of water were added under nitrogen. The reaction was heated to 95° C., monitored by UV-vis. The reaction was complete (UV-vis in MeOH, Abs. $\lambda_{591\ nm}/\lambda_{637\ nm}=0.87$) after 22 hours of heating. 50 g (0.10 mol) of Fomrez® 11-225 was added. Water was removed under vacuum. Then the temperature was raised to 120° C. and charged 86 g (1.0 mol) of γ-butyrolactone and 0.30 g of Ti(OBu)₄. The mixture was heated to 120° C. for 80 hours. 210 g of blue colorant was obtained as a paste with color strength of 11.2 abs./g/L (MeOH) and the maximum absorbency at 636 nm. 66.5% transesterification was obtained based on HPLC.

Example 15

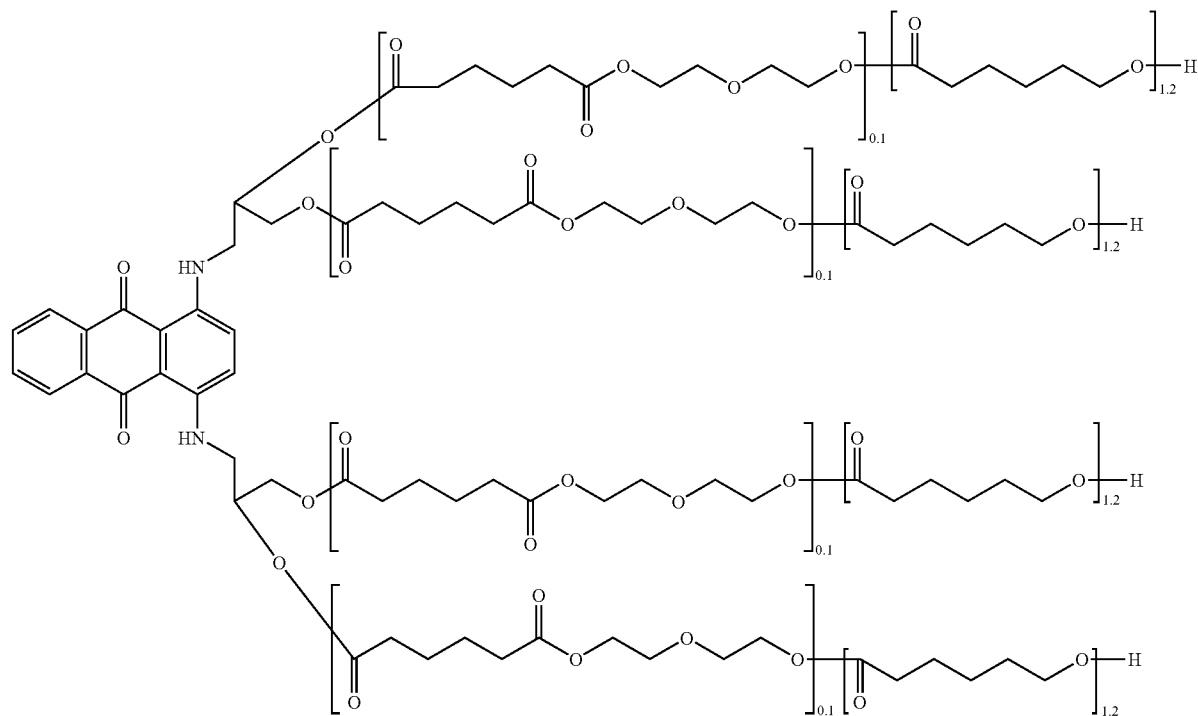

To a 100 mL 3-neck round-bottom flask equipped with a mechanical stirrer, a thermal controller and a reflux condenser, were charged 18.0 g (75 mmol) of quinizarin, 6.05 g (25 mmol) of leucoquinizarin, 2.0 g (10 mmol) of PEG 200. 19.0 g (208 mmol) of 3-amino-1,2-propanediol and 50 mL of water were added under nitrogen. The reaction was heated to 95° C., monitored by UV-vis. The reaction was complete (UV-vis in MeOH, Abs. $\lambda_{591\ nm}/\lambda_{637\ nm}$=0.82) after 20 hours of heating. 10 g (0.020 mol) of Fomrez® 11-225 was added. Water was removed under vacuum. Then the temperature was raised to 120° C. and charged 57 g (0.50 mol) of ε-caprolactone and 0.17 g of Fascat® FC-9102 The mixture was heated to 120° C. under air for 25 hours. 102 g of liquid blue dye was obtained with color strength of 14.6 abs./g/L (MeOH) and the maximum absorbency at 635 nm. 81.0% transesterification was obtained based on HPLC.

Example 16

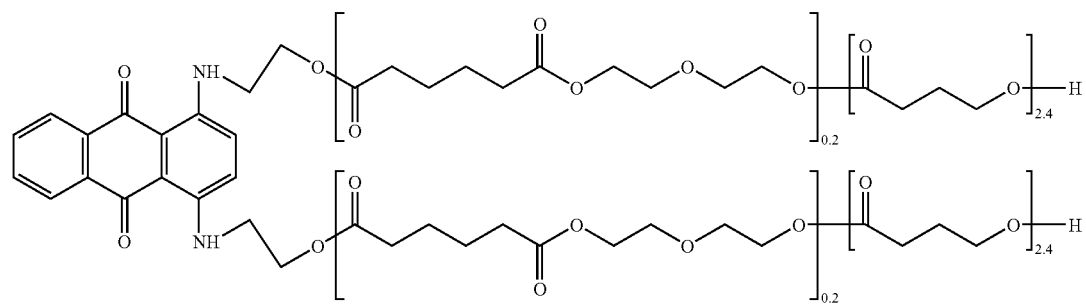

24.2 g (0.10 mol) of leucoquinizarin, 72.0 g (0.30 mol) of quinizarin were added into a 500 mL three-neck round bottom flask. Under the $N_2$, 0.25 gram (4.0 mmol) of boric acid, 10 g (0.05 mol) of PEG 200, 50 g (0.82 mol) of ethanolamine, and 200 mL of water were added afterwards. The mixture was stirred and heated to 95° C. under $N_2$. The reaction was complete (UV-vis in MeOH, Abs. $\lambda_{590\ nm}/\lambda_{636\ nm}$= 0.82) after 27 hours. It was oxidized by air for two hours while the temperature was kept below 75° C. Then water was removed under the vacuum. 50 g (0.1 mol) of Fomrez® 11-225 was added and a paste was formed. The reaction was charged with 172 g (2.0 mol) of γ-butyrolactone and 0.6 g of Fascat® FC-9102. The mixture was heated to 120° C. under air for 33 hours. A liquid blue colorant (343 g) was obtained with color strength of 11.2 abs./g/L (MeOH) and the maximum absorbency at 636 nm.

Example 17

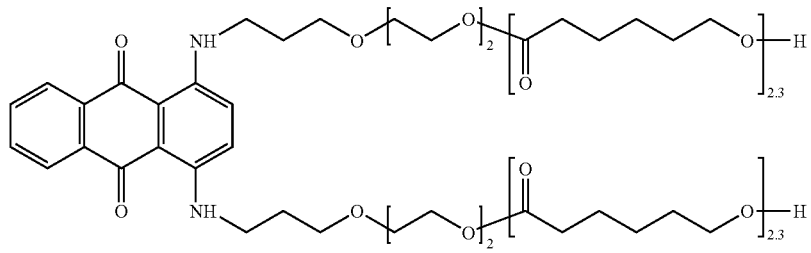

To a 250 mL 3-neck round-bottom flask equipped with a mechanical stirrer, a thermal controller and a reflux condenser, were charged 34.2 g (140 mmol) of quinizarin, 11.6 g (48 mmol) of leucoquinizarin, 67 g (410 mmol) of Polyglycolamine H-163 (from Dixie Chemical) and 68 mL of water under nitrogen. The reaction was heated to 95° C., monitored by UV-vis. The reaction was complete (Uv-vis in MeOH, Abs. $\lambda_{592\ nm}/\lambda_{639\ nm}$=0.84) after 4 hours of heating. The mixture was then cooled down 75 C and air was passed through for 2 hours until peaks at 460 nm and 490 nm disappeared. Upon removal of water was at 70 C under vacuum, the mixture was charged 100 g (870 mmol) of ε-caprolactone and 0.1 g of Ti(OBu)$_4$. Then the mixture was heated to 120° C. under air for 23 hours. 190 g of homogenous liquid blue colorant was obtained with color strength of 14.5 abs./g/L (MeOH) and the maximum absorbency at 639 nm. 70% transesterification was achieved based on HPLC.

Article Production a) Polyether Foam Formation

The inventive blue colorants were incorporated with the following composition and in accordance with the following formulation and procedure:

| Component | Amount |
| --- | --- |
| Arcol ® F3020 Polyol (from Bayer) | 100 grams |
| Water | 4.53 mL |
| DABCO 33LV (catalyst, from Air Products) | 0.15 mL |
| DABCO T10 (catalyst) | 0.32 mL |
| L520 Silicone (Crompton Corp.) | 1.0 mL |

-continued

| Component | Amount |
| --- | --- |
| 80/20 Toluene diisocyanate (Bayer)(112 index) | 49.0 |
| Inventive Blue colorant | as noted |

Upon mixture within a reaction vessel, the reaction created a "health" bubble, and the vessel was then exposed to 185° C. for about 10 min to form a blue foam. The resultant foam buns were then analyzed for performance, as discussed in details below. Both of the samples rendering the same standard and desirable foam performance as exhibited by the above foam article compared with a control (a foam made with above formulation without the addition of any colorant).

b) Polyester Foam Formation

New blue colorants made with the inventive process were incorporated with the following composition and in accordance with the following formulation and procedure:

| Component | Amount |
| --- | --- |
| Fomrez ® 76 (from Crompton Corp.) | 100 grams |
| Water | 3.60 mL |
| DABCO B-16 (catalyst, from Air Products) | 0.17 mL |
| L532 Silicone | 1.0 mL |
| n-Ethylmorpholine (catalyst, from Aldrich) | 2.30 mL |
| 80/20 Toluene diisocyanate (Bayer)(112 index) | 37.0 |
| Inventive Bue colorant | as noted |

Upon mixture within a reaction vessel, the reaction created a "health" bubble, and the vessel was then exposed to 160° C. for about 10 min to form ablue polyester foam. The resultant foam bun was then analyzed for performance, as discussed in detail below. Blue foams were made with 2 php and 4 php of the inventive colorants of EXAMPLES 2 and 3, both samples rendering the same standard and desirable foam resiliency and density as exhibited by the above foam article compared with a control (a foam made with above formulation without the addition of any colorant).

Chemical and Physical Analysis of Produced Articles

Examples 18 & 19

Blue polyether foams were made according to the procedure described in a), with 2 php and 4 php of the inventive blue colorants from Example 2 and Example 3, respectively, and exhibited good resiliency and densities measured at about 1.5 pounds per cubic foot.

Examples 20 & 21

Blue polyether foams were made according to the procedure described in a), with 2 php and 4 php of the inventive blue colorant from Example 17, respectively, and exhibited good resiliency and densities measured at about 1.5 pounds per cubic foot.

Examples 22 & 23

Blue polyester foams were made according to the procedure described in b) with 2 php and 4 php of the inventive blue colorants from Example 2 and Example 3, respectively, and exhibited good resiliency and densities measured at about 2.0 pounds per cubic foot.

c) Performance Characteristics of Polyether Foams Including Inventive Blue Colorants The foams made in accordance in a) and b), above, were all tested for standard foam performance, in terms of bun rise time, tack time, and bun height, and compared with the same non-colored polyether or polyester foam. Measurements within 5% of the control are considered acceptable for the finished foam product. The measurements for inventive polyether foams were as follows:

TABLE 1

Performance of Inventive Blue Colored and Control Non-Colored Foams

| Sample # | Rise Time (min) | Tack Time (min) | Bun Height (mm) |
|---|---|---|---|
| Example 18, containing 2 php Blue from Example 2 | 1.73 | 3 | 235 |
| Example 19, containing 4 php blue from Example 3 | 1.80 | 3 | 240 |
| Example 20, containing 2 php Blue from Example 17 | 1.70 | 3 | 244 |
| Example 21, containing 4 php Blue from Example 17 | 1.66 | 3 | 247 |
| Control | 1.70 | 3 | 245 |

Thus, the blue colorants produced by the inventive process provide acceptable polyurethane foam articles as compared with control sample.

d) Extraction Measurements From Polyurethane Foams

The colored foam from Examples 18, 19, 20, and 21, above, were analyzed for extraction levels using the following method. The extraction test involved cutting 1 gram of the cured foam from the center of the sample and post-curing the cut foam for another 20 minutes (at 160° C. in a glass jar). After cooling to room temperature, 75 grams of methanol were then added to the glass jar that was then capped for 1 hour. The foam was then removed and the extract liquor was analyzed under Beckman DU-650 UV/V is spectrophotometer for the maximum absorption. An absorbance of less than 0.1 is considered acceptable.

TABLE 2

Extraction Levels of the Blue Colored Foams Made with New Blues Produced by the Inventive Process

| Foam Example # | Inventive Blue Example | Extraction Absorbance |
|---|---|---|
| Example 18 | Example 2, 2 php | 0.0329 |
| Example 19 | Example 3, 4 php | 0.0613 |
| Example 20 | Example 17, 2 php | 0.0298 |
| Example 21 | Example 17, 4 php | 0.0534 |

The results were well below the extraction level limit of 0.1, were therefore considered to be acceptable. Thus, the new liquid blue colorants produced by the inventive processes, passed foam extraction tests.

e) High TDI Index Stability of the Inventive Blue Colorants in Flexible Polyurethane Foams The accelerated high TDI stability performance test for the inventive blue colorants was conducted according to the following method, and compared with the performance of a standard poly(oxyalkylenated) blue anthraquinone colorant REACTINT® Blue X17AB (Milliken & Company). Two standard 1.5 lb/ft$^3$ density polyether foams containing 2 g of inventive blue colorant from Example 3, or Reactint® Blue X17AB, respectively, were prepared according to the procedure described in Examples 17 and 18 (using 49 ml of TDI), immediately after the health bubble, the foams were placed in a microwave oven (Kenmore, Model #566.8868411) for 10 min at 20% power to reach 185° C. (to simulate actual heat exposures encountered in an industrial production process), and subsequently in a 160° C. oven for 3 min. The foams were then allowed to cool to ambient temperature and sliced the bun vertically down the center and saved the slices as the STANDARDS. The above processes were then repeated (still using 2 g of inventive blue colorant from Example 3, or Blue X17AB colorant, respectively) by using 55 ml of TDI (at an TDI index of 1.25—an amount in excess of 15 weight % for the total composition) to produce SAMPLE foam articles for the inventive blue from Example 3 and Blue X17AB. Both respected foam slices (STANDARD vs. SAMPLE, for both inventive blue of Example 3 and the Blue X17AB colorant, respectively) were then compared reading in Hunter CMC for delta E which indicates the color change from the STANDARD foam article as compared with the respected SAMPLE foam article. The results are tabulated below with a lower delta E value being more desirable and thus indicating greater color stability therein towards high TDI index. Under the said accelerated test condition, a delta E value of less than 6 is considered to be acceptable as high TDI stable colorants.

TABLE 3

TDI Stability Performance of Inventive and Comparative Blue Polyether Foams

| Colorant | delta E |
|---|---|
| Inventive Blue from Example 3 | 3.17 |
| Reactint ® Blue X17AB | 15.00 |

Thus, while exposure to high TDI index, the inventive blue colorants exhibit far more improved color retention and thus performance, when compared to existing commercial product such as Reactint® Blue X17AB. Thus the inventive blue colorants provide acceptable polyurethane foam articles under high TDI index conditions, as compared with control sample.

f) Color Stability and Scorch Test of the Inventive Blue Colorants in Rigid Polyurethane Foams (A/B Systems)

Inventive blue colorants were incorporated with the rigid polyurethane A/B systems in accordance with the following formulation and procedure:

| Component | Amount |
| --- | --- |
| Component A: Mondur 489 (Polymeric MDI) | 150 grams |
| Component B: Terate ® 2031/2032 Aromatic Polyester Polyol | 50 grams |
| Colorant | as noted |

The Component A is Mondur 489, which is polymeric diphenylmethane diisocyanate (MDI) from Bayer, and the Component B is Terate® 2031/2032 Aromatic Polyester Polyol from Kosa, Wilmington, N.C.

CONTROL Rigid Foam Formation: To make a CONTROL foam, Colorant was first mixed well with Component B. Upon mixture with Component A within a reaction vessel, the reaction was let free-foaming for 3 min until it stopped rising. After cooling down to room temperature, the resultant foam bun was vertically cut through center of the bun and then analyzed the performance as discussed in detail below.

SAMPLE Rigid Foam Formation: To make a SAMPLE foam, same procedure to make CONTROL foam was followed, but the foam bun was placed into a microwave oven (Kenmore, Model #566.8868411) for 10 minutes at 15% power AFTER the foam stopped rising, to simulate the heat history present within an industrial production process. Upon cooling down to room temperature, the resultant foam bun was vertically cut through center of the bun, and then analyzed as discussed in detail below.

Example 24

Color Stability of the Inventive Blue vs. Comparative Blue: Two CONTROL foam buns were made according to above procedure using 1 gram of the inventive blue from Example 3 and Reactint® Blue X17AB. After cutting, the slices of the foam buns were visually compared the color shade and depth on the edges section with those on the center of the same bun. The bigger the difference, the less stable the color is. Visually detectable color loss was observed from the foam bun made with Reactint® Blue X17AB, whereas no detectable shade change and color loss was found from the foam bun made with the inventive blue colorant from Example 3.

This suggests the inventive blue colorants are more stable in A/B systems than commercial product Reactint® Blue X17AB.

Example 25

Scorch Test of the Inventive Blue vs. Comparative Blue: Two CONTROL foam buns were made according to above "CONTROL Rigid Foam Formation" procedure using 1 gram of the inventive blue from Example 3 and Reactint® Blue X17AB, respectively. And two SAMPLE foam buns were made according to above "SAMPLE Rigid Foam Formation" procedure using 1 gram of the inventive blue from Example 3 and Reactint® Blue X17AB, respectively. Both respected foam slices (CONTROL vs. SAMPLE, for both inventive blue of Example 3 and Reactint® Blue X17AB, respectively) were then compared reading in the center of the foam slices in Hunter CMC for delta E, which indicates the color change from the CONTROL foam article as compared with the respected SAMPLE foam article. The results are tabulated below with a lower delta E value being more desirable and thus indicating greater color stability in rigid A/B systems. Under the said accelerated test condition, a delta E value of less than 6 is considered to be acceptable as stable A/B system colorants.

TABLE 4

Scorch Performance of Inventive Blue Colorant and Reactint ® Blue X17A B in Rigid A/B Systems

| Colorant | Delta E |
| --- | --- |
| Inventive Blue from Example 3 | 3.27 |
| Reactint ® Blue X17AB | 11.84 |

Thus, while exposure to high temperature in rigid polyurethane foam A/B systems, the inventive blue colorants exhibit far more improved color retention and thus performance, when compared to existing commercial product such as Reactint® Blue X17AB. Thus the inventive blue colorants provide acceptable rigid polyurethane foam articles in A/B systems, as compared with control sample.

g) Color Stability of the New Black Formulation Containing Inventive Blue Colorants in Flexible Polyurethane Foams and Rigid Polyurethane Foams (A/B Systems)

New Black Formulation Containing Inventive Blue Colorants: A new black was formulated using the inventive blue from Example 3 to reach the similar shade and color strength to commercial products Reactint® Black X95AB (from Milliken Chemical, containing Reactint® Blue X17AB) and Reactint® Black 1852 (from Milliken Chemical, containing Reactint® Blue X17AB). The color stability of this new black formulation was evaluated against the performance of Black X95AB and Black 1852 in three different polyurethane systems: flexible polyether, Freerise A/B, and rigid A/B.

TABLE 5

New Black Formulation Containing Inventive Blue Colorants

| Component | Amount (wt %) |
| --- | --- |
| Inventive Blue from Example 3 | 60.5 |
| Reactint ® Orange X96 | 35.0 |
| Reactint ® Violet X80LT | 4.5 |

Black Flexible Polyether Foam Formation: The new black colorant, as well as Black X95AB and Black 1852 were incorporated with the following composition and in accordance with the following formulation and procedure [as described in above, Section a)]:

| Component | Amount |
| --- | --- |
| Arcol ® F3020 Polyol (from Bayer) | 100 grams |
| Water | 4.53 mL |
| DABCO 33LV (catalyst, from Air Products) | 0.15 mL |
| DABCO T10 (catalyst) | 0.32 mL |
| L520 Silicone | 1.0 mL |
| 80/20 Toluene diisocyanate (Bayer)(112 index) | 49.0 |
| Black colorant | as noted |

Upon mixture within a reaction vessel, the reaction created a "health" bubble, and the vessel was then exposed to 185° C. for about 10 min to form a black foam. The resultant foam buns were then analyzed for performance, as discussed in details below. All of the 3 samples rendering the same standard and desirable foam performance as exhibited by the above foam article compared with a control (a foam made with above formulation without the addition of any colorant).

Example 26

Performance of the New Black Formulation in Flexible Polyurethane Foams: Three black polyether foams were made with 0.5 php of New Black Formulation containing the inventive blue colorants from Example 3, Black X95AB and Black 1852, respectively, and exhibited good resiliency and densities measured at about 1.5 pounds per cubic foot. All of the 3 black foams have similar shade and color strength as observed visually, and measured by Hunter CMC. All 3 foams were tested for standard foam performance, in terms of bun rise time, tack time, and bun height, and compared with the same non-colored polyether foam. Measurements were all within 5% of the control thus considered acceptable for the finished foam products. It was also observed that the New Black foam had less metamerism than commercial products Black X95AB and Black 1852.

Thus the new black formulated with the inventive blue colorant is suitable for flexible polyurethane foam application as a replacement for Black X95AB and Black 1852.

Free Rise Foam (A/B System) Formation: The new black containing the inventive blue colorant, as well as Black X95AB and Black 1852 were incorporated with the rigid polyurethane A/B systems in accordance with the following formulation and procedure:

| Component | Amount |
| --- | --- |
| Component A: Isofoam ® R-1107A (Polymeric MDI) | 50 grams |
| Component B: Otto Bock W-700 V US Colorless (Polyol blend) | 100 grams |
| Black Colorant | as noted |

Component A—Isofoam® R-1107A is a polyurethane isocyanate component mixture (Polymeric MDI) from IPI, Inc, Elkton, Md. Component B—Otto Bock W-700 V US Colorless is a mixture of polyether polyol system (product code: K8569) from Bayer.

Colorant was first mixed well with Component B. Upon mixture with Component A within a reaction vessel, the reaction was let free foaming for 3 min until it stopped rising. After cooling down to room temperature, the resultant foam bun was then cut through the center of the bun, and the slices were analyzed for performance, as discussed in detail below.

Example 27

Performance of the New Black Formulation in Free Rise Foams (A/B Systems): Three black Free Rise (A/B Systems) foams were made with 0.5 php of New Black Formulation containing the inventive blue colorants from Example 3, Black X95AB and Black 1852, respectively, and exhibited good physical properties. All of the 3 black foams have similar shade and color strength as observed visually, and measured by Hunter CMC. All 3 foams were tested for standard foam performance, and the measurements were all within 5% of the control thus considered acceptable for the finished foam products.

Thus the new black formulated with the inventive blue colorant is suitable for Freerise (A/B Systems) foam application as a replacement for Black X95AB and Black 1852.

Rigid Polyurethane Foam (A/B Systems): The new black containing the inventive blue colorant, as well as Black X95Ab and Black 1852 were incorporated with the rigid polyurethane A/B systems in accordance with the following formulation and procedure:

| Component | Amount |
| --- | --- |
| Polypro ® Component A (Polymeric MDI) | 100 grams |
| Polypro ® Component B (Polyol blend) | 100 grams |
| Colorant | as noted |

Both Polypro® Components A and B are products from Polyfoam Products Inc, Tomball, Tex. Component A is polymeric diphenylmethane diisocyanate (Polymeric MDI), and Component B is a mixture of polyol blend that mainly contains polyols as well as other components.

CONTROL Rigid Foam Formation: To make a CONTROL foam, black colorant was first mixed well with Component B. Upon mixture with Component A within a reaction vessel, the reaction was let free-foaming for 3 min until it stopped rising. After cooling down to room temperature, the resultant foam bun was vertically cut through center of the bun and then analyzed the performance as discussed in detail below.

SAMPLE Rigid Foam Formation: To make a SAMPLE foam, same procedure to make CONTROL foam was followed, but the foam bun was placed into a microwave oven (Kenmore, Model #566.8868411) for 10 minutes at 15% power AFTER the foam stopped rising, to simulate the heat history generated in an industrial production process. Upon cooling down to room temperature, the resultant foam bun was vertically cut through center of the bun, and then analyzed as discussed in detail below.

Example 28

Color Stability of New Black Containing Inventive Blue Colorant vs. Comparative Black Colroants: Three CONTROL foam buns were made according to above procedure using 0.5 gram of the New Black containing the inventive blue from Example 3, Reactint® Black X95AB and Black 1852. After cutting, the slices of the foam buns were visually compared the color shade and depth on the edges section with those on the center of the same bun. The bigger the difference, the less stable the color is. Visually detectable shade change (blue color loss) was observed from the foam bun made with Reactint® Black X95AB and Black 1852, whereas no detectable shade change and color loss was found from the foam bun made with the New Black containing the inventive blue colorant from Example 3.

This suggests that the New Black formulated with the inventive blue colorants are suitable for A/B systems as a replacement for commercial products Reactint® Black X95AB and Black 1852.

Example 29

Scorch Test of the New Black Containing Inventive Blue vs. Comparative Black Colorants: Three CONTROL foam buns were made according to above "CONTROL Rigid Foam Formation" procedure using 0.5 gram of the New Black containing the inventive blue from Example 3, Reactint® Black X95AB and Black 1852, respectively. Three SAMPLE foam buns were made according to above "SAMPLE Rigid Foam Formation" procedure using 0.5 gram of the New Black, Reactint® Black X95AB and Black 1852, respectively. Both respected foam slices (CONTROL vs. SAMPLE, for New Black, Reactint® Blue X95AB and Black 1852, respectively) were then compared reading in the center of the foam slices in Hunter CMC for delta E, which indicates the shade change/color loss from the CONTROL foam article as compared with the respected SAMPLE foam article. The results are tabulated below with a lower delta E value being more desirable and thus indicating greater color stability in rigid A/B systems.

TABLE 6

Scorch Performance of the New Black Containing Inventive Blue Colorant vs. Reactint ® Black X95AB and Black 1852 in Rigid A/B Systems

| Colorant | delta E |
| --- | --- |
| New Black (formulated with Inventive Blue from Example 3) | 1.56 |
| Reactint ® Black X95AB | 4.10 |
| Reactint ® Black 1852 | 5.26 |

Thus, while exposure to high temperature in rigid polyurethane foam A/B systems, the New Black containing inventive blue colorants exhibit far more improved color retention and thus performance, when compared to existing commercial product such as Reactint® Black X95AB and Black 1852. Thus the New Black formulated with inventive blue colorants provides acceptable rigid polyurethane foam articles in A/B systems, as compared with control sample.

The results suggest that the New Black formulated with the inventive blue colorants are suitable for A/B systems as a replacement for commercial products Reactint® Black X95AB and Black 1852.

There are, of course, many alternative embodiments and modifications of the present invention which are intended to be included within the spirit and scope of the following claims.

We claim:

1. A method of producing, without any intermediate isolation steps required, a liquid polymeric anthraquinone colorant comprising the steps of:
   a) reacting together quinizarin, leucoquinizarin, and an amine-alcohol compound;
   b) oxidizing the resultant compound of step "a"; and
   c) reacting the resultant compound of step "b" with a polyesterified compound in the presence of a ring-opening compound to from a polyesterified anthraquinone colorant.

2. The method of claim 1 wherein said liquid polymeric anthraquinone colorant includes at least one hydroxy-terminated polyester chain attached thereto through an amine linking group.

3. The method of claim 2 wherein said hydroxy group-terminated polyester chain is attached through said amine linking group to the 1-, 4-, or both positions of said anthraquinone colorant.

4. The method of claim 1 wherein said colorant conforms to the structure of Formula (V)

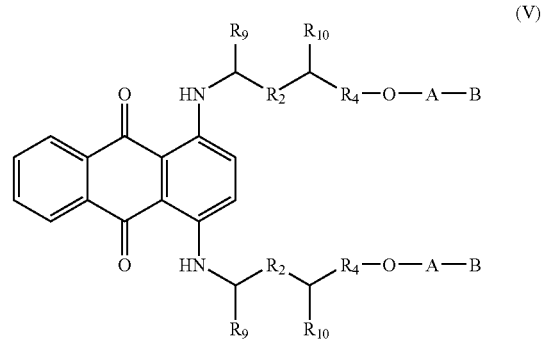

wherein $R_2$ and $R_4$ are the same or different and are selected from the group consisting of alkylene radicals having from 1 to 10 carbon atoms, phenyl or substituted phenyl radicals; wherein A is a group selected from structures represented by Formulas (X) and (XI)

$$\text{(X)}$$

$$\text{(XI)}$$

wherein n is an integer from 1 to 10; m is any positive number from 1 to 20, $R_3$ is a group selected from a H, an alkyl group having 1 to 10 carbon atoms, phenyl or substituted phenyl groups, or a group represented by Formula (VII)

$$-R_4-OH \quad \text{(VII)}$$

wherein $R_4$ is defined as above; and E is a group selected from structures represented by Formula (XII)

$$\text{(XII)}$$

wherein $R_{11}$ and $R_{12}$ are independently selected from a H, an alkyl group having 1 to 10 carbon atoms, phenyl or substituted phenyl groups; $R_{13}$ is an alkyl radical having 2 to 5 carbon atoms, x and y are independently integers from 2 to 20; and z is any positive number from 1 to 20;

and wherein $R_9$ is a group selected from hydrogen, an alkyl group having from 1 to 10 carbon atoms, phenyl, substituted phenyl, or a group represented by Formula (XIII)

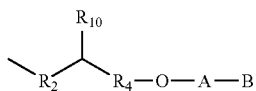 (XIII)

and wherein $R_{10}$ is a group selected from a H, an alkyl group having from 1 to 10 carbon atoms, phenyl, substituted phenyl, or a group represented by Formula (XIV)

 (XIV)

and wherein B is a group selected from H and structures represented by Formulas (XV) and (XVI)

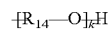 (XV)

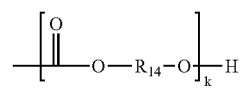 (XVI)

wherein $R_{14}$ is an alkylene radical or substituted alkylene radical having 2 to 10 carbons; and k is any positive number from 0 to 20.

* * * * *